United States Patent [19]

Muramatsu et al.

[11] Patent Number: 5,208,202

[45] Date of Patent: * May 4, 1993

[54] EXHAUST GAS CLEANER AND METHOD OF CLEANING EXHAUST GAS CATALYST FOR CLEANING EXHAUST GAS

[75] Inventors: Gyo Muramatsu; Kiyohide Yoshida; Satoshi Sumiya; Akira Abe, all of Kumagaya, Japan

[73] Assignee: Kabushiki Kaisha Riken, Tokyo, Japan

[ * ] Notice: The portion of the term of this patent subsequent to Dec. 24, 2008 has been disclaimed.

[21] Appl. No.: 765,580

[22] Filed: Sep. 25, 1991

[30] Foreign Application Priority Data

Sep. 25, 1990 [JP] Japan ................................ 2-256218
Sep. 25, 1990 [JP] Japan ................................ 2-256219
Sep. 25, 1990 [JP] Japan ................................ 2-256220
Sep. 25, 1990 [JP] Japan ................................ 2-256221
Sep. 25, 1990 [JP] Japan ................................ 2-256222

[51] Int. Cl.$^5$ .......................... B01J 23/04; B01J 23/10
[52] U.S. Cl. .................................. 502/302; 502/303; 502/304; 423/213.2
[58] Field of Search ................. 502/302, 303, 304; 423/213.2

[56] References Cited

U.S. PATENT DOCUMENTS

| 3,896,048 | 7/1975 | Mehalchick et al. | 502/73 |
| 4,001,371 | 1/1977 | Remeika et al. | 423/213.2 |
| 4,291,126 | 9/1981 | Sugier et al. | 502/302 X |
| 4,742,038 | 5/1988 | Matsumoto | 502/303 |

FOREIGN PATENT DOCUMENTS

| 0130835A | 2/1984 | European Pat. Off. . |
| 63-100919 | 5/1988 | Japan . |
| 194946 | 4/1989 | Japan . |
| 2236493A | 4/1991 | United Kingdom . |

*Primary Examiner*—W. J. Shine
*Attorney, Agent, or Firm*—Brumbaugh, Graves, Donohue & Raymond

[57] ABSTRACT

The exhaust gas cleaner comprising a heat-resistant, porous body and a catalyst supported by the body for cleaning an exhaust gas containing substantially no fine carbonaceous particles, which is equivalent to an oxidizing atmosphere, the catalyst consisting essentially of (a) one or more alkali metal elements; (b) one or more transition metal elements in Group IB; Group IIB, Group VB, Group VIB, Group VIIB and Group VIII of the Periodic Table (excluding platinum-group elements), and Sn; and (c) one or more rare earth elements. The second catalyst consisting essentially of at least one platinum-group element, may be supported by the heat-resistant, porous body.

17 Claims, No Drawings

EXHAUST GAS CLEANER AND METHOD OF CLEANING EXHAUST GAS CATALYST FOR CLEANING EXHAUST GAS

BACKGROUND OF THE INVENTION

The present invention relates to an exhaust gas cleaner capable of efficiently removing nitrogen oxides from an exhaust gas containing substantially no fine carbonaceous particles, which is regarded as an oxidizing atmosphere, and a method of cleaning an exhaust gas using such an exhaust gas cleaner.

The nitrogen oxides (hereinafter referred to simply as "NOx") contained in the exhaust gas discharged from internal engines of automobiles, etc., various external engines, industrial combusting equipments, etc. are causing environmental problems, because the NOx has been known as a main cause for acidic rain.

As methods for removing the NOx from the exhaust gas, there has been known to reduce the NOx discharged from gasoline engines to a harmless $N_2$ in the presence of a three-component catalyst, or to react the NOx discharged from the industrial exhaust gas with $NH_3$ as a reducing agent in the presence of an oxide catalyst.

However, in general, in an atmosphere of high-oxygen concentration, the reduction reaction of the NOx is less likely to proceed without adding a reducing gas. For instance, in the exhaust gas of gasoline engines, etc., under the conditions in which the exhaust gas has a high oxygen content and thus a high air-fuel ratio (on the lean side), it is difficult to reduce the NOx in the presence of a three-component catalyst. Therefore, an attempt has been made to reduce the NOx in the presence of a proper catalyst by using fine carbonaceous particles (hereinafter referred to simply as "particulate matter") as a reducing agent. However, since the amount of fine carbonaceous particles contained in the exhaust gas of the gasoline engines is extremely small, this method cannot practically be used.

Recently, an intense research has been made on catalysts capable of efficiently removing NOx and methods of removing NOx by using such catalysts.

For instance, Japanese Patent Laid-Open No. 1-94946 discloses a highly active catalyst for decomposing nitrogen oxides, which catalyst comprises an aluminosilicate zeolite having a particular lattice surface distance and supporting copper (I) or copper (II) and ammonia at a molar ratio (ammonia/copper) of 0.2 or more.

Japanese Patent Laid-Open No. 63-100919 discloses a method of removing nitrogen oxides from an exhaust gas by bringing the exhaust gas containing nitrogen oxides into contact with a copper-containing catalyst in the presence of a hydrocarbon in an oxidizing atmosphere.

However, the conventional catalysts and methods exemplified above suffer from poor efficiency and durability when the exhaust gas has a high oxygen concentration, namely, in an oxidizing atmosphere. Accordingly, they are not advantageous for an actual use.

OBJECT AND SUMMARY OF THE INVENTION

Accordingly, an object of the present invention is to provide a catalyst capable of efficiently removing NOx from an exhaust gas containing substantially no fine carbonaceous particles (namely, an extremely small amount of fine carbonaceous particles, if any) and a small amount of combustible substances such as unburned hydrocarbons (hereinafter referred to simply as "HC"), which exhaust gas is regarded as an oxidizing atmosphere, such as the exhaust gas of gasoline engines having a high air-fuel ratio (on the lean side), at a relatively low temperature.

Another object of the present invention is to provide an exhaust gas cleaner containing the above catalyst.

A further object of the present invention is to provide a method of cleaning an exhaust gas using the above exhaust gas cleaner.

As a result of intense research in view of the above objects, the inventors have found that by using an exhaust gas cleaner comprising a heat-resistant, porous body which carries a catalyst consisting essentially of at least one alkali metal element, at least one particular transistion element and at least one rare earth metal element, the nitrogen oxides can be efficiently removed from the exhaust gas having a high oxygen concentration (regarded as an oxidizing atmosphere) and containing substantially no fine carbonaceous particles by reducing the nitrogen oxides with the hydrocarbons coexisting in the exhaust gas. The inventors also have found that by using an exhaust gas cleaner comprising a heat-resistant, porous body which carries on the inlet side a catalyst consisting essentially of at least one alkali metal element, at least one particular transition element and at least one rare earth metal element, and on the outlet side a catalyst consisting essentially of a platinum-group element, the nitrogen oxides, CO and the unreacted hydrocarbons can be efficiently removed from the exhaust gas. The present invention is based upon these findings.

Thus, the catalyst according to the present invention removes nitrogen oxides from an exhaust gas containing substantially no fine carbonaceous particles regarded as an oxidizing atmosphere, by utilizing unburned hydrocarbons contained in the exhaust gas as agents for reducing the nitrogen oxides, the catalyst consisting essentially of:

(a) one or more alkali metal elements;
(b) one or more transition metal elements in Group IB Group IIB, Group VB, Group VIB, Group VIIB, and Group VIII of the Periodic Table (excluding platinum-group elements), and Sn; and
(c) one or more rare earth elements.

The first exhaust gas cleaner according to the present invention comprises a heat-resistant, porous body and the above catalyst supported by the body for cleaning an exhaust gas containing substantially no fine carbonaceous particles, which is regarded as an oxidizing atmosphere.

The second exhaust gas cleaner according to the present invention comprises a heat-resistant, porous body, a first catalyst supported by the body on the inlet side, and a second catalyst supported by the body on the outlet side, for cleaning an exhaust gas containing substantially no fine carbonaceous particles, which is regarded as an oxidizing atmosphere, the first catalyst consisting essentially of:

(a) one or more alkali metal elements;
(b) one or more transition metal elements in Group IB, Group IIB, Group VB, Group VIB, Group VIIB Group VIII of the Periodic Table (excluding platinum-group elements), and Sn; and
(c) one or more rare earth elements, and
the second catalyst consisting essentially of at least one platinum-group element.

The method of cleaning an exhaust gas according to the present invention comprises the step of passing the exhaust gas through the above heat-resistant, porous body, whereby the nitrogen oxides are reduced by unburned hydrocarbons existing as reducing agents in the exhaust gas.

DETAILED DESCRIPTION OF THE INVENTION

Since the porous body for supporting the catalyst according to the present invention is exposed to a high-temperature exhaust gas, it is required to have an excellent heat resistance, and particularly an excellent thermal shock resistance. Such heat-resistant materials include ceramics such as alumina, silica, zirconia, titania and their composites such as silica-alumina, alumina-zirconia, alumina-titania, silica-titania, silica-zirconia, titania-zirconia, mullite, cordierite, etc.

The porous bodies made of the above ceramic materials may be filters of a honeycomb-type or a foam-type suffering from only small pressure loss, or an assembly of porous pellets.

In the case of the honeycomb-type or foam-type ceramic filter, it has a size which may vary depending upon its purpose, but in general, it preferably has a diameter of 50–400 mm and a length of 5–30 mm. If necessary, a plurality of ceramic filters may be laminated.

According to the first embodiment, the porous body carries a catalyst consisting essentially of (a) one or more of alkali metal elements (Li, Na, K, Cs, etc.); (b) one or more of transition metal elements in Group IB, Group IIB, Group VB, Group VIB and Group VIIB, and Group VIII (excluding the platinum-group elements) of the Periodic Table, and Sn; and (c) one or more of rare earth elements (Ce, La, Nd, Sm, etc.).

The catalyst consisting essentially of the above components serves to accelerate the reduction reaction of NOx by using HC as a reducing agent in the exhaust gas regarded as an oxidizing atmosphere at a relatively low temperature. Specifically, in the presence of this catalyst, HC is activated even at a relatively low temperature of about 200°–500° C., and the reduction of the NOx to $N_2$ can be efficiently carried out by reacting HC with the NOx. The reason why the reduction of the NOx can easily take place at a relatively low temperature is that the components (a), (b) and (c) in the catalyst show synergistic effects.

The component (a) of the catalyst is preferably K and/or Cs. Particularly when Cs is used, any unburned hydrocarbons including saturated hydrocarbons such as propane, etc. can be reacted with the NOx, so that the NOx is efficiently removed from the exhaust gas. This is due to the fact that the presence of Cs serves to increase the selectivity of the reaction of the hydrocarbons with NOx, thereby reducing the reaction between the hydrocarbons and oxygen in the exhaust gas.

The component (b) of the catalyst preferably includes Cu (Group IB), V Group VB, Group VIIB, etc., alone or in combination, and Ag may be added.

The component (c) of the catalyst may be preferably Ce and/or La (rare earth element).

The amounts of the three components (a), (b) and (c), respectively, expressed in weight ratios of metal elements themselves, are (a) 10–80%, (b) 10–80% and (c) 10–80%, and preferably (a) 25–50%, (b) 25–50%, and (c) 25–50%. The total amount of (a)+(b)+(c) is generally 0.1–10%, preferably 0.5–5% based on the carrier layer. Incidentally, if the pellets are used as carriers, the above total amount should be determined, so that the percentage of the first catalyst relative to the exhaust gas is the same as above.

The exhaust gas containing substantially no fine carbonaceous particles (namely, an extremely small amount of fine carbonaceous particles, if any), which is to be treated according to the present invention, means an exhaust gas containing fine carbonaceous particles in an amount of 0.003 g/Hp·hour or less. Such an exhaust gas is typically discharged from gasoline engines, etc. Incidentally, the exhaust gas of diesel engines contains about 0.3–0.6 g/Hp·hour of fine carbonaceous particles, although it may slightly vary depending upon the operating conditions, loads, etc. of the diesel engines.

The exhaust gas of gasoline engines, etc. containing substantially no fine carbonaceous particles ("particulate matter"), which is regarded as an oxidizing atmosphere, usually contains about 100–500 ppm of the unburned hydrocarbons (HC) and about 200–4000 ppm of the NOx. Incidentally, the term "oxidizing atmosphere" means that the amount of oxygen in the exhaust gas is larger than that necessary for burning all combustible components therein. The oxygen content in such an exhaust gas is generally more than 4% by volume.

Typical examples of the HC may be propane, propylene, acetylene, ethylene, etc. When the unburned HC is hydrocarbons having unsaturated bonds such as propylene, acetylene, etc., previously proposed catalysts containing Cu alone as a catalytic component are effective to some extent to reduce NOx by using the unburned HC as reducing agents. However, when saturated hydrocarbons such as propane, etc. are used as reducing agents, the reduction reaction does not efficiently take place. This is due to the fact the reactivity of carbon-carbon bonds is in the following order: triple bonds (acetylene, etc.)>double bonds (ethylene, propylene, etc.)>single bonds (propane, etc.), and that when saturated hydrocarbons having poor reactivity such as propane are used, the reduction reaction of the NOx does not take place sufficiently in the presence of the conventional catalysts.

However, when the catalyst of the present invention is used, the NOx can be efficiently removed even when saturated hydrocarbons such as propane, etc. are used as reducing agents. Accordingly, the removal of NOx is remarkably improved with the catalyst of the present invention as compared to the conventional catalysts. Since the HC in the exhaust gas is mainly composed of methane, ethylene and acetylene, the reduction reaction temperature of the NOx is, as described above, 200°–500° C. and preferably 250°–450° C. When the reaction temperature is too high, the burning of the HC itself takes place, making it uneffective as a reducing agent for the NOx.

When the amount of the HC serving as a reducing agent in the exhaust gas is too small, the HC such as propane, propylene, etc. may be introduced into the exhaust gas in an amount necessary for the reduction of the NOx.

According to the second embodiment, the porous body such as the honeycomb-type or foam-type ceramic filter carries the above catalyst (first catalyst) and a second catalyst.

The second catalyst containing a platinum-group element having a high oxidation activity is used to remove unburned hydrocarbons and CO. The preferred examples of such catalyst include a Pt catalyst, a Pd catalyst, a mixture of a Pt catalyst and a Pd catalyst, a mixture of a Pt catalyst, a Pd catalyst and an Rh catalyst. The platinum-group element catalyst may further contain Au and/or Ag. The amount of the platinum-group element is generally 0.01–0.5 weight %, preferably 0.01–0.2 weight %, based on the carrier layer. The amount of Au and/or Ag, if any, is generally 0.001–0.05 weight %, preferably 0.001–0.02 weight %, based on the carrier layer. In this case, too, if the pellets are used, the above amounts should be determined, so that the percentage of the second catalyst relative to the exhaust gas is the same as above.

The above two types of catalysts are separately supported by two portions of the porous body: an inlet side portion and an outlet side portion. In the preferred embodiment, the first catalyst is supported by the porous body on the exhaust gas inlet side, while the second catalyst is supported by the porous body on the exhaust gas outlet side.

By this catalyst arrangement, NOx is reduced by HC in the presence of the first catalyst on the inlet side. Since the first catalyst is based on base metals, the generation of $SO_3$ can be suppressed. Next, the remaining (unburned) hydrocarbons and CO are oxidized in the presence of the second catalyst on the outlet side.

Since a considerable amount of oxygen in the exhaust gas is consumed in the inlet portion of the porous body, the concentration of the remaining oxygen is relatively low on the outlet side. Accordingly, the remaining NOx is reduced by CO and remaining (unburned) hydrocarbons in the presence of the second catalyst on the outlet side.

In order to produce the exhaust gas cleaner according to the first embodiment, the three-component catalyst (base metal catalyst) is supported by the above heat-resistant, porous body by (a) a direct supporting method such as in impregnation method, or a precipitation method, or (b) an indirect method in which the catalyst is applied onto a more porous carrier layer formed on the porous body. Incidentally, the porous carrier layer may be made of ceramics such as alumina, silica, zirconia, titania and their composite ceramics such as silica-alumina, alumina-zirconia, alumina-titania, silicatitania, silica-zirconia, titania-zirconia, etc.

In the impregnation method, the catalyst is supported by the heat-resistant, porous body by immersing the porous body in an aqueous solution of carbonates, nitrates, acetates, chlorides, hydroxides, etc. of catalyst-forming metals. In addition, the porous body may be immersed in a solution of compounds containing a plurality of base metals such as alkali ferrocyanide, etc.

In the precipitation method, a ceramic carrier supporting a catalyst is produced by mixing an aqueous solution of nitrates, etc. of metal elements constituting the ceramic carrier with an aqueous solution of metal salts for the catalyst, and coprecipitating them by a known method.

In the indirect supporting method (method (b)), a carrier layer is formed on the porous body by a wash-coating method, a sol-gel method, etc.

In the wash-coating method, the porous body is immersed in a slurry of the above porous carrier material and dried so that a carrier layer is formed on the porous body. To support the catalyst by a carrier layer, there are two methods available: (1) a method of applying the catalyst by impregnation or precipitation to the carrier layer wash-coated on the porous body, and (2) a method of forming a catalyst-supporting carrier layer on the porous body by wash-coating the porous body with a catalytic components-containing ceramic powder prepared by an impregnation method or a precipitation method. According to the latter method (2), the catalyst-supporting carrier layer can be formed by a single step.

In the sol-gel method, either one of the following two procedures can be conducted.

The first sol-gel method comprises hydrolyzing organic salts (for instance, alkoxides) of the ceramic carrier-constituting metals; applying the resulting sol to the ceramic body; bringing the coated ceramic body into contact with water vapor, etc. to form a layer composed of colloidal particles; drying and burning it to convert it to a carrier layer for the catalyst; and applying the catalyst to the carrier layer. For instance, when catalytic metals are to be supported by a titania ($TiO_2$) carrier layer, a solution of Ti alkoxide (for instance, $Ti(O\text{-iso }C_3H_7)_4$) in alcohol is mixed with an acid such as $CH_3COOH$, $HNO_3$, HCl, etc. to prepare a coating solution, and the ceramic body is immersed in the coating solution. After removing the ceramic body from the coating solution, it is reacted with vapor or water to cause gelation. After drying and burning, a thin titania coating is formed on a porous surface of the ceramic body. Next, the coated ceramic body is impregnated with an aqueous solution of carbonates, nitrates, acetates, hydroxides, etc. of catalytic components; and the impregnated layer is dried and burned on the ceramic body.

In the second sol-gel method, the ceramic carrier materials and the catalytic components are simultaneously applied to the ceramic body. For instance, a solution of Ti alkoxide in alcohol is mixed with an acid such as $CH_3COOH$, $HNO_3$, HCl, etc. and an aqueous solution of catalytic component metal salts to prepare a coating solution, and the ceramic body is immersed in the coating solution. After removing the ceramic body from the coating solution, it is reacted with vapor or water to prepare a sol, which is then converted to a gel. The gel is dried and then burned to provide a catalyst-supporting ceramic carrier.

By using the sol-gel method, the catalyst can be extremely uniformly dispersed in the ceramic body, leading to an increase in catalytic activity.

In the sol-gel method, the acid serves as a hydrolysis catalyst in the course of gelation. However, alkali metals may be added in place of the acids to conduct the hydrolysis reaction.

The catalytic metal salts may be of any type, as long as they are soluble in water, including carbonates, nitrates, acetates, hydroxides, etc. In addition, for the purpose of uniformly dispersing catalyst metal salts in an alkoxide solution in alcohol, a dispersing agent such as ethylene glycol, etc. is preferably added.

In order to produce the exhaust gas cleaner according to the second embodiment, the three-component catalyst (first catalyst) and the second catalyst are supported by the above heat-resistant, porous body by the following methods.

In the case of disposing the first catalyst on the inlet side of the porous body, the porous body is immersed in an aqueous solution of carbonates, nitrates, acetates, chlorides, hydroxides, etc. of catalyst-forming metals. Alternatively, the porous body may be immersed in a solution of compounds containing a plurality of base metals such as alkali ferrocyanide, etc.

In the case of disposing the second catalyst on the outlet side of the porous body, only a thin portion on the outlet side of the porous body is immersed in an aqueous solution of salts such as chlorides of platinum-group elements.

In the case of using a foam-type porous body, its low-density portion is located on the inlet side, while its high-density, thin-layer portion is located on the outlet side. The first catalyst for reducing NOx is supported by the low-density portion of the porous body, while the second catalyst for removing the remaining HC and CO is supported by the high-density, thin-layer portion of the porous body. Since the inlet side of the porous body has a relatively low density (high porosity), the exhaust gas can easily enter into fine pores of the porous body. In addition, since the flow of the exhaust gas is suitably restricted by the high-density, thin-layer portion on the outlet side, efficient removal of CO and HC and efficient reduction of NOx in the low-density portion can be achieved.

The high-density, thin-layer portion can be formed on one side (corresponding to the outlet side) of the heat-resistant, porous foam-type body by the following methods:

(a) A slurry of a ceramic foam material such as cordierite is poured into a mold having a desired shape whose bottom surface is coated with a parting agent comprising glycerin, water and a surfactant, and the resulting molded product is removed from the mold, dried and then sintered.

(b) A uniform ceramic body is first formed, and one surface of the body is coated with a mixture of ceramic powder such as cordierite and an organic binder. The resulting composite body is dried and then sintered.

The heat-resistant, porous foam-type body thus formed preferably has a low-density portion having a porosity of about 60-90% and a pore size of 3-1000 $\mu m$ (average: about 200-800 $\mu m$), and a high-density, thin-layer portion having a porosity of 40-70% and a pore size of 3-400 $\mu m$ (average: about 20-30 $\mu m$). The high-density, thin-layer portion per se has a thickness of 5-2000 $\mu m$, preferably 10-50 $\mu m$.

The impregnation of the heat-resistant, porous foam-type body with the two types of catalysts may be conducted by the following method: First, the heat-resistant, porous foam-type body is immersed in a solution of carbonates, nitrates, acetates, hydroxides, etc of metals for the first catalyst. Alternatively, it may be conducted by immersing the body in a solution containing a plurality of base metal compounds such as alkali ferrocyanide.

The impregnation of the high-density, thin-layer portion of the body with the second catalyst can be conducted by immersing only the high-density, thin-layer portion of the body in a solution of platinum-group element chloride, etc.

To increase the catalyst-supporting area of the body, it is desirable that the heat-resistant, porous foam-type body supports the catalysts via a porous carrier layer having a large surface area such as an alumina powder layer, a silica powder layer, a titania powder layer, a titania-alumina powder layer, a titania-silica powder layer, etc. Particularly, to reduce pressure loss by the exhaust gas cleaner, the catalysts should be applied uniformly. For this purpose, it is desirable to use a wash-coating method or a sol-gel method to form a carrier layer on the porous body.

Further, by conducting light irradiation to the body impregnated with an aqueous solution of platinum-group element compounds such as chlorides of Pt, Pd, Rh, etc., catalyst-carrying efficiency is extremely increased. The irradiation can be conducted by means of a mercury vapor lamp having a power output of 500 W or so. Alternatively, it is possible to deposit the platinum-group element catalyst in the carrier powder by light irradiation and then to coat the catalyst-supporting carrier powder on the body. By this light irradiation method, the catalyst can be supported by the carrier powder in high dispersion, and the coating layer of the body can be made thin, whereby pressure drop can be minimized in the high-density, thin-layer portion.

Incidentally, in the above explanation, catalyst components are expressed as metal elements. However, the base metal catalysts usually exist in the form of oxides. Accordingly, please not that K, for instance, is actually in the form of $K_2O$.

Although the above explanation has been made with respect to the case of using alumina or titania as a ceramic carrier material, any other ceramics may be similarly used to support the catalyst. For instance, in the case of supporting the catalytic components by alumina, the same methods as above may be used except for using alkoxides of Al. Other porous carriers may be used in the same manner as above.

The present invention will be described in further detail by way of the following Examples. In each Example and Comparative Example, catalytic components are described simply by metal elements for simplicity.

EXAMPLE 1

$\gamma$-alumina powder was impregnated with 2.5 weight % of Cu by using an aqueous solution of $CuCl_2$, 2.5 weight % of Ce by using an aqueous solution of $Ce(NO_3)_3$, and then with 2.5 weight % of K using an aqueous solution of $K_2CO_3$, based on the $\gamma$-alumina.

The $\gamma$-alumina thus impregnated was dried and then burned at a temperature of 400° C. or higher for 3 hours to produce the following catalyst (weight: 1.7 g):

Example 1: ($\gamma$-$Al_2O_3$/Cu/Ce/K)

With respect to this catalyst, a conversion rate of NO to $N_2$ at 300° C. was measured by bringing an exhaust gas comprising 10% of oxygen, 800 ppm of NO, 300 ppm of $C_3H_6$ as HC, 10% of $H_2O$ and balance substantially an $N_2$ gas into contact with the catalyst at a flow rate of 5.8 l/min. The results are shown in Table 1.

EXAMPLE 2

In the same manner as in Example 1, titania powder was impreganted with 2.5 weight % of Cu by using an aqueous solution of $CuCl_2$, 2.5 weight % of La by using an aqueous solution of $La(NO_3)_3$, and then with 2.5 weight % of K by using an aqueous solution of $K_2CO_3$, based on the titania powder. After drying the impregnated titania powder, it was burned at 400° C. or higher for 3 hours to produce the following catalyst:

Example 2: ($TiO_2$/Cu/La/K)

With respect to the catalyst thus obtained, a conversion rate of NO to $N_2$ was measured in the same manner as in Example 1. The results are shown in Table 1.

EXAMPLES 3 AND 4

In the same manner as in Example 1, the titania powder was impregnated with the metal-containing catalysts as follows:

Example 3: Impregnated with 2.5 weight % of Cu, 2.5 weight % of La and 2.5 weight % of Cs. (TiO$_2$/Cu/La/Cs)

Example 4: Impregnated with 2.5 weight % of Cu, 2.5 weight % of Ce and 2.5 weight % of Cs. (TiO$_2$/Cu/Ce/Cs)

With respect to the above catalysts, conversion rates of NO to N$_2$ at 300° C. were measured by bringing an exhaust gas comprising 10% of oxygen, 800 ppm of NO, 300 ppm of C$_3$H$_8$ as HC, 10% of H$_2$O and balance substantially an N$_2$ gas into contact with the catalysts at a flow rate of 5.8 l/min. The results are shown in Table 1.

EXAMPLES 5 AND 6

A solution of a titanium alkoxide Ti(O-iso C$_3$H$_7$)$_4$ in alcohol was mixed with CH$_3$COOH, and aqueous solutions of CuCl$_2$, Ce(NO$_3$)$_3$ and KCl were added thereto to provide a coating solution. After applying the coating solution to a ceramic body, it was reacted with water to allow the formation of a sol, which was then converted to a gel. After drying the gel, it was burned at 500° C. for 3 hours to obtain a catalyst consisting of 2.5 weight % of Cu, 2.5 weight % of Ce and 2.5 weight % of K, based on TiO$_2$.

Example 5: (TiO$_2$/Cu/Ce/K)

This catalyst was subjected to the same test as in Example 1 to measure a conversion rate of NO to N$_2$ at 300° C. The results are shown in Table 1.

In the same manner as in Example 5, a catalyst was produced except for using Al(O-iso C$_3$H$_7$)$_3$. The catalyst consisting of 2.5 weight % of Cu, 2.5 weight % of La and 2.5 weight % of Cs based on Al$_2$O$_3$ was obtained.

Example 6: (Al$_2$O$_3$/Cu/La/Cs)

This catalyst was subjected to the same test as in Example 3 to measure a conversion rate of NO to N$_2$ at 300° C. The results are shown in Table 1.

COMPARATIVE EXAMPLES 1 AND 2

γ-alumina powder was impregnated with 2.5 weight % of Pt by using an aqueous solution of Pt chloride, based on the γ-alumina powder, and dried and then burned in the same manner as in Example 1 to produce the following catalyst:

Comparative Example 1: (γ-Al$_2$O$_3$/Pt)

With respect to this catalyst, the same test as in Example 1 was conducted. The results are shown in Table 1.

Separately, γ-Al$_2$O$_3$ powder was impregnated with 2.5 weight % of Pd by using an aqueous solution of Pd chloride, based on the γ-Al$_2$O$_3$ powder, and dried and then burned in the same manner as in Example 1 to produce the following catalyst:

Comparative Example 2: (γ-Al$_2$O$_3$/Pd)

With respect to this catalyst, the same test as in Example 3 was conducted. The results are shown in Table 1.

TABLE 1

| No. | Conversion Rate of NO to N$_2$ (%) |
|---|---|
| Example 1 | 35 |
| Example 2 | 30 |
| Example 3 | 35 |
| Example 4 | 30 |
| Example 5 | 35 |
| Example 6 | 30 |
| Comparative Example 1 | 0 |
| Comparative Example 2 | 0 |

TABLE 1-continued

| No. | Conversion Rate of NO to N$_2$ (%) |
|---|---|
| Example 2 | |

As is clear from Table 1, the catalysts of Examples 1-6 show NO conversion rates of 30% or more. On the other hand, the catalysts of Comparative Examples 1 and 2 do not substantially remove NO.

EXAMPLE 7

A disc-shaped, honeycomb-type cordierite filter (thickness: 50 mm, apparent volume: 35 cm$^3$, weight: 17 g, porosity: 74%) was coated with γ-Al$_2$O$_3$ powder in an amount of 10 weight %, based on the cordierite filter, by a wash-coating method.

The coated cordierite filter was impregnated with 2.5 weight % of Cu by using an aqueous solution of CuCl$_2$, 2.5 weight % of Ce by using an aqueous solution of Ce(NO$_3$)$_3$ and then 2.5 weight % of K by using an aqueous solution of K$_2$CO$_3$, each based on γ-Al$_2$O$_3$.

After drying the impregnated cordierite filter, it was burned at 500° C. for 3 hours to produce an exhaust gas cleaner.

With respect to this exhaust gas cleaner, a conversion rate of NO to N$_2$ at 300° C. was measured by bringing a gas comprising 10% of O$_2$, 800 ppm of NO, 300 ppm of C$_3$H$_6$ as HC, 10% of H$_2$O and balance substantially an N$_2$ gas into contact with the exhaust gas cleaner at a flow rate of 5.8 l/min. The results are shown in Table 2.

EXAMPLE 8

A solution of an aluminum alkoxide Al(O-iso C$_3$H$_7$)$_3$ in alcohol was mixed with acetic acid, and aqueous solutions of CuCl$_2$, Ce(NO$_3$)$_3$ and KCl were added thereto to prepare a coating solution.

A disc-shaped, foam-type cordierite filter (thickness: 50 mm, apparent volume: 35 cm$^3$, weight: 12 g, porosity: 85%) was immersed in the above coating solution. The coating solution applied to the ceramic filter was hydrolyzed with vapor to form a sol, which was then converted to a gel.

After drying the coated cordierite filter, it was burned at 500° C. for 3 hours to provide the cordierite filter with 10 weight %, based on the ceramic filter, of an Al$_2$O$_3$ carrier layer, which supported 2.5 weight % of Cu, 2.5 weight % of Ce and 2.5 weight % of K, each based on the alumina carrier layer.

With respect to this exhaust gas cleaner, a conversion rate of NO to N$_2$ at 300° C. was measured in the same manner as in Example 7. The results are shown in Table 2.

EXAMPLE 9

A disc-shaped, foam-type cordierite filter (thickness: 50 mm, apparent volume: 35 cm$^3$, weight: 12 g, porosity: 85%) was coated with TiO$_2$ powder in an amount of 10 weight % by a wash-coating method.

The TiO$_2$ carrier layer-coated cordierite filter was impregnated with 2.5 weight % of Cu by using an aqueous solution of CuCl$_2$, 2.5 weight % of La by using an aqueous solution of La(NO$_3$)$_3$, and 2.5 weight % of Cs by using an aqueous solution of CsNO$_3$, each based on the TiO$_2$ carrier layer.

After drying the impregnated cordierite filter, it was burned at 500° C. for 3 hours to produce an exhaust gas cleaner at a flow rate of 5.8 l/min.

With respect to this exhaust gas cleaner, a conversion rate of NO to $N_2$ at 300° C. was measured by bringing a gas comprising 10% of $O_2$, 800 ppm of NO, 300 ppm of $C_3H_8$ as HC, 10% of $H_2O$ and balance substantially an $N_2$ gas into contact with the exhaust gas cleaner at a flow rate of 5.8 l/min. The results are shown in Table 2.

EXAMPLE 10

A solution of titanium alkoxide $Ti(O\text{-iso }C_3H_7)_4$ in alcohol was mixed with acetic acid, and aqueous solutions of $CuCl_2$, $La(NO_3)_3$ and $CsNO_3$ were added thereto to prepare a coating solution.

By using this coating solution and a disc-shaped, foam-type cordierite filter (thickness: 50 mm, apparent volume: 35 cm$^3$, weight: 12 g, porosity 85%), an exhaust gas cleaner was produced in the same sol-gel method as in Example 8.

The resulting exhaust gas cleaner had 10 weight %, based on the cordierite filter, of a $TiO_2$ carrier layer, which supported 2.5 weight % of Cu, 2.5 weight % of La and 2.5 weight % of Cs, each based on the $TiO_2$ carrier layer.

With respect to this exhaust gas cleaner, a conversion rate of NO to $N_2$ at 300° C. was measured in the same manner as in Example 9. The results are shown in Table 2.

COMPARATIVE EXAMPLES 3 AND 4

The same honeycomb-type cordierite filter as in Example 7 was coated with $\gamma$-$Al_2O_3$ powder in an amount of 10 weight % based on the cordierite filter, by a washcoating method.

The coated cordierite filter was impregnated with 10 weight %, based on $\gamma$-$Al_2O_3$, of Cu by using an aqueous solution of Cu chloride. The impregnated cordierite filter was dried and burned at 500° C. for 3 hours to obtain an exhaust gas cleaner (Comparative Example 3).

In the same manner as in Comparative Example 3, the coated cordierite filter was impregnated with 0.5 weight %, based on $\gamma$-$Al_2O_3$, of Pt by using an aqueous solution of Pt chloride. The impregnated cordierite filter was dried and burned at 500° C. for 3 hours to obtain an exhaust gas cleaner (Comparative Example 4).

With respect to the exhaust gas cleaner of Comparative Example 3, a conversion rate of NO to $N_2$ was measured under the same conditions as in Example 7. With respect to the exhaust gas cleaner of Comparative Example 4, a conversion rate of NO to $N_2$ was measured under the same conditions as in Example 9. The results are shown in Table 2.

TABLE 2

| No. | Conversion Rate of NO to $N_2$ (%) |
| --- | --- |
| Example 7 | 15 |
| Example 8 | 20 |
| Example 9 | 15 |
| Example 10 | 20 |
| Comparative Example 3 | 0 |
| Comparative Example 4 | 0 |

As is clear from Table 2, the exhaust gas cleaners of Examples 7-10 show NO conversion rates of 15% or more. On the other hand, the exhaust gas cleaners of Comparative Examples 3 and 4 do not substantially remove NO.

EXAMPLE 11

A solution of an aluminum alkoxide $Al(O\text{-iso }C_3H_7)_3$ in alcohol was mixed with acetic acid, and aqueous solutions of $CuCl_2$, $Ce(NO_3)_3$ and KCl were added thereto to prepare a coating solution.

A disc-shaped, honeycomb-type cordierite filter (thickness: 50 mm, apparent volume: 35 cm$^3$, weight: 17 g, porosity: 74%) was immersed in the above coating solution. The coating solution applied to the cordierite filter was hydrolyzed with vapor to form a sol, which was then converted to a gel.

After drying the coated cordierite filter, it was burned at 500° C. for 3 hours to provide the cordierite filter with 10 weight %, based on the cordierite filter, of an $Al_2O_3$ carrier layer, which supported 2.5 weight % of Cu, 2.5 weight % of Ce and 2.5 weight % of K, each based on the alumina carrier layer.

With respect to this exhaust gas cleaner, a conversion rate of NO to $N_2$ at 300° C. was measured by bringing a gas comprising 10% of $O_2$, 800 ppm of NO, 300 ppm of $C_3H_6$ as HC, 10% of $H_2O$ and balance substantially an $N_2$ gas into contact with the exhaust gas cleaner at a flow rate of 5.8 l/min. The results are shown in Table 3.

EXAMPLE 12

A solution of titanium alkoxide $Ti(O\text{-iso }C_3H_7)_4$ in alcohol was mixed with acetic acid, and aqueous solutions of $CuCl_2$, $La(NO_3)_3$ and $CsNO_3$ were added thereto to prepare a coating solution.

By using this coating solution and a disc-shaped, foam-type cordierite filter (thickness: 50 mm, apparent volume: 35 cm$^3$, weight: 12 g, porosity 85%), an exhaust gas cleaner was produced in the same sol-gel method as in Example 11. The resulting exhaust gas cleaner had 10 weight %, based on the cordierite filter, of a $TiO_2$ carrier layer, which supported 2.5 weight % of Cu, 2.5 weight % of La and 2.5 weight % of Cs, each based on the $TiO_2$ carrier layer.

With respect to this exhaust gas cleaner, a conversion rate of NO to $N_2$ at 300° C. was measured by bringing a gas comprising 10% of $O_2$, 800 ppm of NO, 300 ppm of $C_3H_8$ as HC, 10% of $H_2O$ and balance substantially an $N_2$ gas into contact with the exhaust gas cleaner at a flow rate of 5.8 l/min. The results are shown in Table 3.

COMPARATIVE EXAMPLES 5 and 6

The same honeycomb-type cordierite filter as in Example 11 was coated with $Al_2O_3$ powder in an amount of 10 weight % based on the cordierite filter, by a sol-gel method.

The coated cordierite filter was impregnated with 2.5 weight %, based on $Al_2O_3$, of Cu by using an aqueous solution of Cu chloride. The impregnated cordierite filter was dried and burned at 500° C. for 3 hours to obtain an exhaust gas cleaner (Comparative Example 5).

In the same manner as in Comparative Example 5, the coated cordierite filter was impregnated with 0.5 weight %, based on $Al_2O_3$, of Pt by using an aqueous solution of Pt chloride. The impregnated cordierite filter was dried and burned at 500° C. for 3 hours to obtain an exhaust gas cleaner (Comparative Example 6).

With respect to the exhaust gas cleaner of Comparative Example 5, a conversion rate of NO to $N_2$ was measured under the same conditions as in Example 11. With respect to the exhaust gas cleaner of Comparative Example 6, a conversion rate of NO to $N_2$ was measured under the same conditions as in Example 12. The results are shown in Table 3.

TABLE 3

| No. | Conversion Rate of NO to $N_2$ (%) |
| --- | --- |
| Example 11 | 22 |
| Example 12 | 24 |
| Comparative Example 5 | 0 |
| Comparative Example 6 | 0 |

As is clear from Table 3, the exhaust gas cleaners of Examples 11 and 12 show NO conversion rates of more than 20%. On the other hand, the exhaust gas cleaners of Comparative Examples 5 and 6 do not substantially remove NO.

EXAMPLE 13

A disc-shaped, foam-type cordierite filter (thickness: 50 mm, apparent volume: 35 cm$^3$, weight: 12 g, porosity: 85%) was coated with $\gamma$-$Al_2O_3$ powder in an amount of 10 weight % based on the cordierite filter, by a wash-coating method.

A major portion of the coated cordierite filter except for its 5-mm-thick end portion was impregnated with 2.5 weight % of Cu by using an aqueous solution of $CuCl_2$, 2.5 weight % of Ce by using an aqueous solution of $Ce(NO_3)_3$ and then 2.5 weight % of K by using an aqueous solution of $K_2CO_3$, each based on $\gamma$-$Al_2O_3$. The end portion of the coated cordierite filter was impregnated with 0.02 weight %, based on $\gamma$-$Al_2O_3$, of Pt by using an aqueous solution of $H_2PtCl_6$.

After drying the impregnated cordierite filter, it was burned at 500° C. for 3 hours to produce an exhaust gas cleaner.

With respect to this exhaust gas cleaner, conversion rates of NO, CO and $C_3H_6$ at 300° C. were measured by bringing a gas comprising 10% of $O_2$, 800 ppm of NO, 500 ppm of CO, 300 ppm of $C_3H_6$ as HC, 10% of $H_2O$ and balance substantially an $N_2$ gas at a flow rate of 5.8 l.min, into contact with the exhaust gas cleaner disposed such that the K/Cu/Ce catalyst was positioned on the inlet side. The results are shown in Table 4.

EXAMPLE 14

A disc-shaped, honeycomb-type cordierite filter (thickness: 50 mm, apparent volume: 35 cm$^3$, weight: 17 g, porosity: 74%) was coated with $TiO_2$ powder in an amount of 10 weight % based on the cordierite filter, by a wash-coating method.

A major portion of the coated cordierite filter except for its 5-mm-thick end portion was impregnated with 2.5 weight % of Cu by using an aqueous solution of $CuCl_2$, 2.5 weight % of La by using an aqueous solution of $La(NO_3)_3$ and then 2.5 weight % of Cs by using an aqueous solution of $Cs_2CO_3$, each based on $TiO_2$. The end portion of the coated cordierite filter was impregnated with 0.02 weight %, based on $TiO_2$, of Pt by using an aqueous solution of $H_2PtCl_6$.

After drying the impregnated cordierite filter, it was burned at 500° C. for 3 hours to produce an exhaust gas cleaner.

With respect to this exhaust gas cleaner, conversion rates of NO, CO and $C_3H_8$ at 300° C. were measured by bringing a gas comprising 10% of $O_2$, 800 ppm of NO, 500 ppm of CO, 300 ppm of $C_3H_8$ as HC, 10% of $H_2O$ and balance substantially an $N_2$ gas at a flow rate of 5.8 l/min, into contact with the exhaust gas cleaner disposed such that the Cs/Cu/La catalyst was positioned on the inlet side. The results are shown in Table 4.

COMPARATIVE EXAMPLES 7 AND 8

A foam-type cordierite filter was coated with $\gamma$-$Al_2O_3$ powder in an amount of 10 weight % based on the cordierite filter, by a wash-coating method, and impregnated with 10 weight %, based on $\gamma$-$Al_2O_3$, of Cu by using an aqueous solution of Cu chloride in the same manner as in Example 13. The impregnated cordierite filter was dried and burned at 500° C. for 3 hours to obtain an exhaust gas cleaner (Comparative Example 7).

In the same manner as in Comparative Example 7, the $\gamma$-$Al_2O_3$-coated cordierite filter was impregnated with 0.2 weight %, based on $\gamma$-$Al_2O_3$, of Pt by using an aqueous solution of Pt chloride. The impregnated cordierite filter was dried and burned at 500° C. for 3 hours to obtain an exhaust gas cleaner (Comparative Example 8).

With respect to the exhaust gas cleaners of Comparative Examples 7 and 8, conversion rates of NO, CO and $C_3H_8$ was measured under the same conditions as in Example 14. The results are shown in Table 4

TABLE 4

| | Conversion Rate (%) | | |
| --- | --- | --- | --- |
| No. | NO | CO | HC |
| Example 13 | 20 | 60 | 50 |
| Example 14 | 25 | 60 | 50 |
| Comparative Example 7 | 0 | 0 | 5 |
| Comparative Example 8 | 0 | 100 | 100 |

As is clear from Table 4, the exhaust gas cleaners of Examples 13 and 14 show NO conversion rates of 20% or more. On the other hand, the exhaust gas cleaners of Comparative Examples 7 and 8 do not substantially remove NO. The exhaust gas cleaners of Examples 13 and 14 also show considerably high capability of removing CO and HC.

EXAMPLE 15

A disc-shaped, honeycomb-type cordierite filter (thickness: 50 mm, apparent volume: 35 cm$^3$, weight: 17 g, porosity: 74%) was coated with $TiO_2$ powder in an amount of 10 weight % based on the cordierite filter, by a wash-coating method.

A major portion of the coated cordierite filter except for its 5-mm-thick end portion was impregnated with 2.5 weight % of Cu by using an aqueous solution of $CuCl_2$, 2.5 weight % of Ce by using an aqueous solution of $Ce(NO_3)_3$ and then 2.5 weight % of K by using an aqueous solution of $K_2CO_3$, each based on $TiO_2$. After drying the impregnated cordierite filter, it was burned at 500° C. for 3 hours.

Next, the end portion of the coated cordierite filter was impregnated with 0.02 weight %, based on $TiO_2$, of Pt, and irradiated with ultraviolet rays by using a mercury-vapor lamp of 500 W.

After drying the impregnated cordierite filter, it was burned at 500° C. for 3 hours to produce an exhaust gas cleaner.

With respect to this exhaust gas cleaner, conversion rates of NO, CO and $C_3H_8$ at 300° C. were measured by bringing a gas comprising 10% of $O_2$, 800 ppm of NO, 500 ppm of CO, 300 ppm of $C_3H_8$ as HC, 10% of $H_2O$ and balance substantially an $N_2$ gas at a flow rate of 5.8 l/min, into contact with the exhaust gas cleaner disposed such that the K/Cu/Ce catalyst was positioned on the inlet side. The results are shown in Table 5.

EXAMPLE 16

A disc-shaped, foam-type cordierite filter (thickness: 50 mm, apparent volume: 35 cm$^3$, weight: 12 g, porosity: 85%) was immersed in a solution of Ti(O-iso $C_3H_7)_4$ in alcohol mixed with $CH_3COOH$. The coating solution applied to the cordierite filter was hydrolyzed with water vapor to form a sol, which was then converted to a gel. By this treatment, 10 weight %, based on the cordierite filter, of $TiO_2$ powder was coated on the cordierite filter.

A major portion of the coated cordierite filter except for its 5-mm-thick end portion was impregnated with 2.5 weight % of Cu by using an aqueous solution of $CuCl_2$, 2.5 weight % of La by using an aqueous solution of $La(NO_3)_3$ and then 2.5 weight % of K by using an aqueous solution of KCl, each based on $TiO_2$. The end portion of the coated cordierite filter was impregnated with 0.02 weight %, based on $TiO_2$, of Pt in the same manner as in Example 15.

After drying the impregnated cordierite filter, it was burned at 500° C. for 3 hours to produce an exhaust gas cleaner.

With respect to this exhaust gas cleaner, conversion rates of NO, CO and $C_3H_6$ at 300° C. were measured by bringing a gas comprising 10% of $O_2$, 800 ppm of NO, 500 ppm of CO, 300 ppm of $C_3H_6$ as HC, 10% of $H_2O$ and balance substantially an $N_2$ gas at a flow rate of 5.8 l/min, into contact with the exhaust gas cleaner disposed such that the K/Cu/La catalyst was positioned on the inlet side. The results are shown in Table 5.

COMPARATIVE EXAMPLES 9 AND 10

A foam-type cordierite filter was coated with $TiO_2$ powder in an amount of 10 weight % based on the cordierite filter, and impregnated with 10 weight %, based on $TiO_2$, of Cu by using an aqueous solution of Cu chloride in the same manner as in Example 15. The impregnated cordierite filter was dried and burned at 500° C. for 3 hours to obtain an exhaust gas cleaner (Comparative Example 9).

In the same manner as in Comparative Example 9, the $TiO_2$-coated cordierite filter was impregnated with 0.2 weight %, based on $TiO_2$, of Pt by using an aqueous solution of Pt chloride. The impregnated cordierite filter was dried and burned at 500° C. for 3 hours to obtain an exhaust gas cleaner (Comparative Example 10).

With respect to the exhaust gas cleaners of Comparative Examples 1 and 2, conversion rates of NO, CO and $C_3H_8$ was measured under the same conditions as in Example 15. The results are shown in Table 5.

TABLE 5

| No. | Conversion Rate (%) | | |
|---|---|---|---|
| | NO | CO | HC |
| Example 15 | 25 | 80 | 70 |
| Example 16 | 30 | 80 | 70 |
| Comparative Example 9 | 0 | 0 | 5 |
| Comparative Example 10 | 0 | 80 | 80 |

As is clear from Table 5, the exhaust gas cleaners of Examples 15 and 16 show NO conversion rates of 25% or more. On the other hand, the exhaust gas cleaners of Comparative Examples 9 and 10 do not substantially remove NO. The exhaust gas cleaners of Examples 15 and 16 also show considerably high capability of removing CO and HC.

The exhaust gas cleaner of the present invention is explained above referring to the above Examples, without intending to restrict the catalyst carriers to $\gamma$-$Al_2O_3$ and $TiO_2$, and various catalyst carriers may be used to obtain the same effects.

As described above in detail, the catalyst for cleaning an exhaust gas according to the present invention can efficiently remove NOx by reducing it to $N_2$ at a relatively low temperature using HC as a reducing agent in an oxidizing atmosphere. The exhaust gas-cleaning catalyst and the exhaust gas-cleaning method according to the present invention are highly useful for cleaning the exhaust gas of gasoline engines containing substantially no fine carbonaceous particles.

What is claimed is:

1. A catalyst for cleaning an exhaust gas containing substantially no fine carbonaceous particles, which is capable of removing nitrogen oxides from said exhaust gas regarded as an oxidizing atmosphere by utilizing unburned hydrocarbons contained in said exhaust gas as agents for reducing said nitrogen oxides, said catalyst being a mixture consisting essentially of:
   (a) 10–80% by weight of one or more alkali metal elements selected from the group consisting of Na, K, Cs, Rb and Fr;
   (b) 10–80% by weight of copper; and
   (c) 10–80% by weight of one or more rare earth elements.

2. An exhaust gas cleaner comprising a heat-resistant, porous body and a catalyst supported by said body for cleaning an exhaust gas containing substantially no fine carbonaceous particles which is equivalent to an oxidizing atmosphere, said catalyst being a mixture consisting essentially of:
   (a) 10–80% by weight of one or more alkali metal elements selected from the group consisting of Na, K, Cs, Rb and Fr;
   (b) 10–80% by weight of copper; and
   (c) 10–80% by weight of one or more rare earth elements.

3. The exhaust gas cleaner according to claim 2, each of said metal elements being in the form of an oxide and wherein said catalyst is supported by said heat-resistant porous body by a sol-gel method.

4. The exhaust gas cleaner according to claim 3, wherein a carrier layer is formed on said body by a sol-gel method, and said catalyst is supported by said carrier layer by impregnation or precipitation.

5. The exhaust gas cleaner according to claim 4, wherein said catalyst is supported by said carrier layer at the same time of forming said carrier layer by a sol-gel method using organic salts of catalytic components.

6. An exhaust gas cleaner comprising a heat-resistant, porous body, a first catalyst supported by said body on the inlet side, and a second catalyst supported by said body on the outlet side, for cleaning an exhaust gas containing substantially no fine carbonaceous particles, which is regarded as an oxidizing atmosphere, said first catalyst consisting essentially of:
   (a) one or more alkali metal elements;
   (b) one or more transition metal elements in Group IB, Group IIB, Group VB, Group VIB, Group VIIB, and Group VIII of the Periodic Table, excluding platinum-group elements, and Sn; and (c) one or more rare earth elements; and said second catalyst consisting essentially of at least one platinum-group element.

7. The exhaust gas cleaner according to claim 6, wherein said second catalyst further contains a metal selected from the group consisting of Au Ag, or a combination thereof.

8. The exhaust gas cleaner according to claim 6 or 7, wherein said two catalysts are supported by a carrier layer formed on said porous body.

9. The exhaust gas cleaner according to claim 8, wherein said carrier layer is formed by a wash-coating method or a sol-gel method.

10. The exhaust gas cleaner according to claim 6, wherein said second catalyst is subjected to light irradiation before or after its application to said body.

11. The exhaust gas cleaner according to claim 10, wherein said second catalyst further contains a metal selected from the group consisting of Au Ag, or a combination thereof.

12. The exhaust gas cleaner according to claim 10 or 11, wherein said first and second catalysts are supported by a carrier layer formed on said porous body.

13. The exhaust gas cleaner according to claim 12, wherein said carrier layer is formed by a wash-coating method or a sol-gel method.

14. A catalyst for cleaning an exhaust gas containing substantially no fine carbonaceous particles, which is capable of removing nitrogen oxides from said exhaust gas regarded as an oxidizing atmosphere by utilizing unburned hydrocarbons contained in said exhaust gas as agents for reducing said nitrogen oxides, said catalyst being a mixture consisting essentially of:

(a) 25–50% by weight of one or more alkali metal elements selected from the group consisting of Li, Na, K and Cs;

(b) 25–50% by weight of one or more transition metal elements in Group IB, Group IIB, Group VB, Group VIB, Group VIIB and Group VIII of the Periodic Table, excluding platinum-group elements, and Sn; and (c) 25–50% by weight of one or more rare earth elements.

15. An exhaust gas cleaner comprising a heat-resistant, porous body, a first catalyst supported by said body on the inlet side and a second catalyst supported on the outlet side for cleaning an exhaust gas containing substantially no fine carbonaceous particles, which is equivalent to an oxidizing atmosphere, said catalyst being a mixture consisting essentially of:

(a) 25–50% by weight of one or more alkali metal elements;

(b) 25–50% by weight of one of more transition metal elements in Group IB, Group IIB, Group VB, Group VIB, Group VIIB, and Group VIII of the Periodic Table, excluding platinum-group elements, and Sn; and (c) 25–50% by weight of one or more rare earth elements;

and said second catalyst consisting essentially of at least one platinum-group element.

16. The exhaust gas cleaner according to claim 6, wherein said second catalyst further contains Au and Ag.

17. The exhaust gas cleaner according to claim 10, wherein said second catalyst further contains Au and Ag.

* * * * *

UNITED STATES PATENT AND TRADEMARK OFFICE
CERTIFICATE OF CORRECTION

PATENT NO. : 5,208,202
DATED : May 4, 1993
INVENTOR(S) : Muramatsu et al.

It is certified that error appears in the above-identified patent and that said Letters Patent is hereby corrected as shown below:

Column 3, line 33, "Group VB" should read --Group VB (V, Nb, Ta)--;

Column 3, line 33, "Group VIB" should read --Group VIB (Cr, Mo, W)--;

Column 3, line 33, "Group VIIB" should read --Group VIIB (Mn, Tc, Re)--;

Column 3, line 59, "V Group VB, Group VIIB" should read --V (Group VB), Mn (Group VIIB)--;

Column 5, line 37, "such as in" should read --such as an--;

Column 5, line 44, "silicatitania" should read --silica-titania--;

Column 8, line 18, "not" should read --note--.

Signed and Sealed this

Nineteenth Day of April, 1994

Attest:

BRUCE LEHMAN

*Attesting Officer*   *Commissioner of Patents and Trademarks*